United States Patent [19]
Khandhadia et al.

[11] Patent Number: 5,622,380
[45] Date of Patent: Apr. 22, 1997

[54] VARIABLE NONAZIDE GAS GENERATOR HAVING MULTIPLE PROPELLANT CHAMBERS

[75] Inventors: Paresh S. Khandhadia, Troy; Rickey L. Stratton, Pontiac, both of Mich.

[73] Assignee: Automotive Systems Laboratory, Inc., Farmington Hills, Mich.

[21] Appl. No.: 531,945

[22] Filed: Sep. 21, 1995

[51] Int. Cl.⁶ .................................................. B60R 21/26
[52] U.S. Cl. ......................... 280/736; 280/741; 102/531
[58] Field of Search .................................. 280/736, 741, 280/740, 742, 728.1; 102/530, 531, 443; 422/164, 165, 166

[56] References Cited

U.S. PATENT DOCUMENTS

| | | | |
|---|---|---|---|
| 34,615 | 3/1862 | Shannon | 102/443 |
| 2,529,791 | 11/1950 | Whitworth et al. | 102/530 |
| 3,532,358 | 10/1970 | Selwa et al. | 280/741 |
| 3,726,220 | 4/1973 | MacDonald et al. | 102/530 |
| 3,797,854 | 3/1974 | Poole et al. | 280/741 |
| 4,369,079 | 1/1983 | Shaw | 280/728.1 |
| 4,530,516 | 7/1985 | Adams et al. | 280/741 |
| 4,865,667 | 9/1989 | Zeuner et al. | 280/741 |
| 4,950,458 | 8/1990 | Cunningham | 280/741 |
| 5,009,855 | 4/1991 | Nilsson | 422/164 |
| 5,320,382 | 6/1994 | Goldstein et al. | 280/735 |
| 5,345,875 | 9/1994 | Anderson | 102/530 |
| 5,364,126 | 11/1994 | Kuretake et al. | 280/736 |
| 5,400,487 | 3/1995 | Gioutsos et al. | 280/735 |
| 5,513,879 | 5/1996 | Patel et al. | 280/736 |

FOREIGN PATENT DOCUMENTS

| | | | |
|---|---|---|---|
| 4005768 | 8/1991 | Germany | 280/736 |
| 4-345556 | 12/1992 | Japan | 280/736 |
| 5-319199 | 12/1993 | Japan | 280/736 |

Primary Examiner—Brian L. Johnson
Assistant Examiner—Peter C. English
Attorney, Agent, or Firm—Lyman R. Lyon, P.C.

[57] ABSTRACT

A gas generator (10) utilizes at least three segregated propellant container/combustion chambers (22, 32 and 34), each having a plurality of nonazide propellant grains (20, 36 and 38) therein, and an igniter (16) for igniting only the propellant grains (20) located within the first combustion chamber (22). The nonazide propellant produces enough heat energy to subsequently ignite the segregated propellant grains (36 and 38) by forced convection and/or heat conduction. The output inflation profile can be tailored to optimally cover a range of 10 to 90 percentile vehicle occupants.

4 Claims, 1 Drawing Sheet

VARIABLE NONAZIDE GAS GENERATOR HAVING MULTIPLE PROPELLANT CHAMBERS

BACKGROUND OF THE INVENTION

The present invention generally relates to gas generators such as used to inflate air bags in an automobile occupant protection system, and more particularly to an improved gas generator having a variable inflation rate output capable of safely achieving a low onset inflation.

The prior art generally discloses inflation systems for deploying an air bag in a motor vehicle which provide a single gas generator in fluid communication with the uninflated air bag. The gas generator is typically triggered by an air bag firing circuit when the sensed vehicle acceleration exceeds a predetermined threshold value, as through the use of an acceleration-responsive inertial switch and an explosive "squib."

Conventional single gas generator inflation systems suffer from the disadvantage that the onset pressurization/inflation rate is generally set to provide an aggressive or rapid initial inflation in order to achieve a particular inflation time even for an occupant positioned relatively close to the air bag. However, an aggressive and uncontrolled onset rate of pressurization becomes problematic in situations where the occupant is out of position. More specifically, the rapid pressurization can cause the air bag to impact against the occupant with enough force to injure the occupant.

In commonly owned U.S. Pat. No. 5,400,487, Gioutsos et al teach an inflation system which overcomes the above-described problems by utilizing a plurality of gas generators which are controllably ignited to provide a variable inflation profile which can be tailored to any given occupant position and for any crash type. While this arrangement dramatically improves the inflation efficiency so as to maximize an air bag's ability to protect an occupant, it does so at significantly higher expense and complexity. More specifically, the multiple gas generators and squibs add considerable cost to the system, while the firing control circuitry requires sophisticated processors capable of accurately timing the various ignition times.

In U.S. Pat. No. 5,009,855, Nilsson discloses a gas generator which positions an insert within the propellant combustion chamber so as to partially separate the combustion chamber into two sections having different volumes. In operation, an igniter generates a flame front which initially ignites a small portion of the propellant as the flame front passes through the first section of the combustion chamber, and then ultimately the remaining propellant as the flame front passes around the insert and reaches the second section of the combustion chamber. Nilsson teaches that the gas volume produced by the first propellant section gently presses an out-of-position occupant into the vehicle seat before the second propellant section rapidly inflates the bag to the maximum volume within the shortest possible time.

While Nilsson discloses a gas generator arrangement which produces a lower onset rate of inflation, the precise rate of onset can only be controlled to a small degree since the same igniter flame front must be used to ignite both propellant sections.

In commonly owned copending U.S. patent application Ser. No. 08/498,852 to DeSautelle et al, filed on Jul. 6, 1995, entitled "Dual Chamber Nonazide Gas Generator," a gas generator arrangement is taught which utilizes two isolated propellant chambers to produce a low onset rate without sacrificing peak inflation pressure or inflation time. The inherently high ignition temperatures of a nonazide propellant charge located in the first chamber produces enough heat energy to conductively ignite the nonazide propellant charge located in the second chamber.

While the dual chamber nonazide gas generator of U.S. Ser. No. 08/498,852 provides a dramatic improvement in performance over known gas generators, a need still exists for providing a variable gas generator which can produce an even greater range of inflation profiles tailored to more specific firing situations such as 10 percentile and/or out of position vehicle occupants. Therefore, a need still exists for a gas generator which can satisfactorily produce variable inflation pressurization with a low onset rate.

SUMMARY OF THE INVENTION

Accordingly, it is an object of the present invention to provide an improved gas generator for use in a vehicle air bag inflation system which can optimally produce a low onset rate of pressurization without sacrificing peak inflation pressure or inflation time.

Another object of the present invention is to provide an improved gas generator which produces a variable output inflation profile sufficient to inflate a vehicle air bag to provide optimal protection for a range of 10 to 90 percentile vehicle occupants.

Another object of the present invention is to provide an improved gas generator which utilizes combustion of a first nonazide propellant charge to conductively ignite a segregated second and third nonazide propellant charge.

In accordance with the present invention, a gas generator having a variable output gas generation rate comprises a housing having a plurality of apertures spaced therein, a first propellant chamber located within the housing and arranged to be in fluid communication with the plurality of apertures, and at least a second and third propellant chamber located within the housing and arranged to be in fluid communication with the plurality of apertures. A first nonazide propellant charge is positioned within the first chamber having a predetermined burn temperature, and respective second and third nonazide propellant charges are positioned within the second and third chambers. An igniter is positioned within the housing for supplying a flame front to only the first propellant chamber, wherein the ignition of the first charge by the flame front produces heat energy which subsequently conductively ignites the second and third nonazide propellant charges. Isolation of the first, second and third propellant chambers is achieved by a barrier affixed within the housing. The barrier effectively impedes the igniter flame front from passing from the first chamber to the second and/or third chamber. The chambers can be either radially positioned relative to the igniter to form a pie configuration, or axially positioned relative to the igniter to form a stacked configuration.

The present invention will be more fully understood upon reading the following detailed description of the preferred embodiment in conjunction with the accompanying drawings.

DETAILED DESCRIPTION OF THE PREFERRED EMBODIMENT(S)

Figure 1:
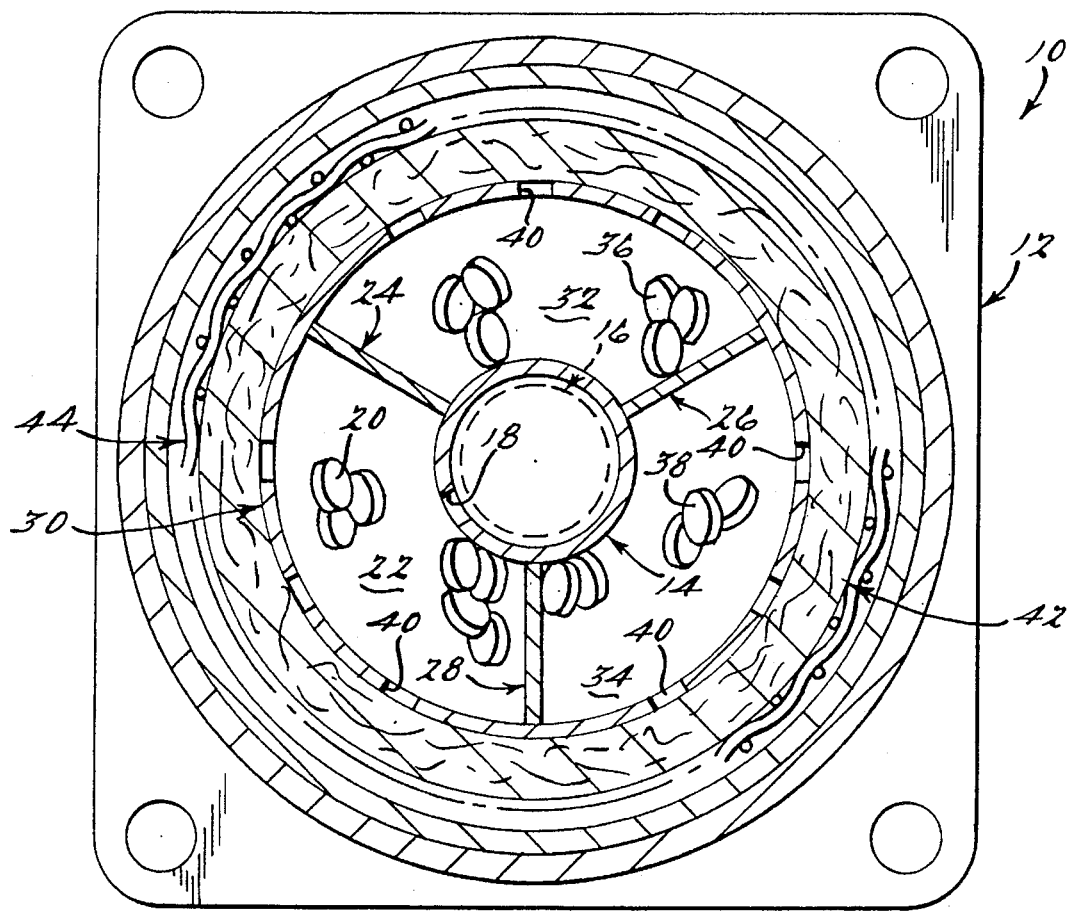
FIG. 1 is an upper cross-sectional view of a variable inflator having three pie configured propellant chambers in accordance with a first exemplary embodiment.

As seen in FIG. 1, a variable gas generator or inflator 10 for an automobile air bag, in accordance with a first exemplary "pie configured" constructed embodiment of the present invention, comprises a housing 12, for example, an aluminum forging provided with a plurality of bag inflating gas discharge orifices (not shown). The housing 12 has an integral central support tube 14 for the mounting of a conventional igniter 16 (shown by dashed line). The igniter 16 is provided with a pair of electrical conductors (not shown) to facilitate electric ignition of an explosive charge contained therein.

The igniter tube 14 is provided with at least one aperture 18 disposed at a point underlying the igniter 16. The aperture 18 allows a flame front generated by the igniter 16 to pass to a nonazide propellant 20 located within a first combustion chamber 22. Three separate barrier walls 24, 26 and 28 are positioned to extend between the igniter tube 14 and an outer propellant retainer sleeve 30 to form a second combustion chamber 32 and a third combustion chamber 34. A nonazide propellant 36 is located within the second combustion chamber 32, and a nonazide propellant charge 38 is located within the third chamber 34. The retainer sleeve 30 has a plurality of apertures 40 therein to permit a radially outward passage of gas generated by the propellant 20, 36 and 38. A filter 42 surrounds the retainer sleeve 30 and comprises a fine wire mesh annulus that is resiliently axially compressed within the housing 12 upon assembly thereof. The filter 42 is radially retained by a relatively heavy wire screen 44 that accommodates radial expansion of the filter element 42 due to longitudinal compression upon assembly of the housing components.

In operation, the gases generated by the propellant charges 20, 36 and 38 exit from the respective combustion chambers through the apertures 40, pass through the filter 42 and the wire mesh screen 44 to exit through the bag inflating orifices located in the housing 12.

In accordance with the present invention, low, variable, onset pressurization is achieved by sectioning the combustion area into the three separate propellant chambers 22, 32 and 34. The barriers 24, 26 and 28 provide a mechanism for preventing the passage of the flame front generated by the igniter 16 from directly causing combustion of the propellant charges 36 and 38, respectively located within chambers 32 and 34. Instead, the heat generated by the combustion of the first propellant charge 20 causes subsequent delayed ignition of the propellant charges 36 and 38 by forced convection and/or conduction. More specifically, the heat energy inherently flows from the higher temperature chamber 22 to the cooler chambers 32 and 34, such as by way of apertures 40. Because the propellant charge located in the first chamber 22 is composed of a nonazide formula, the amount of heat inherently generated at combustion is sufficiently high enough to conductively ignite the propellant charges located within chambers 32 and 34. A conventional azide propellant mixture would not produce enough heat energy to ignite a combustion chamber which is completely isolated from the igniter 16 flame front.

Figure 2:
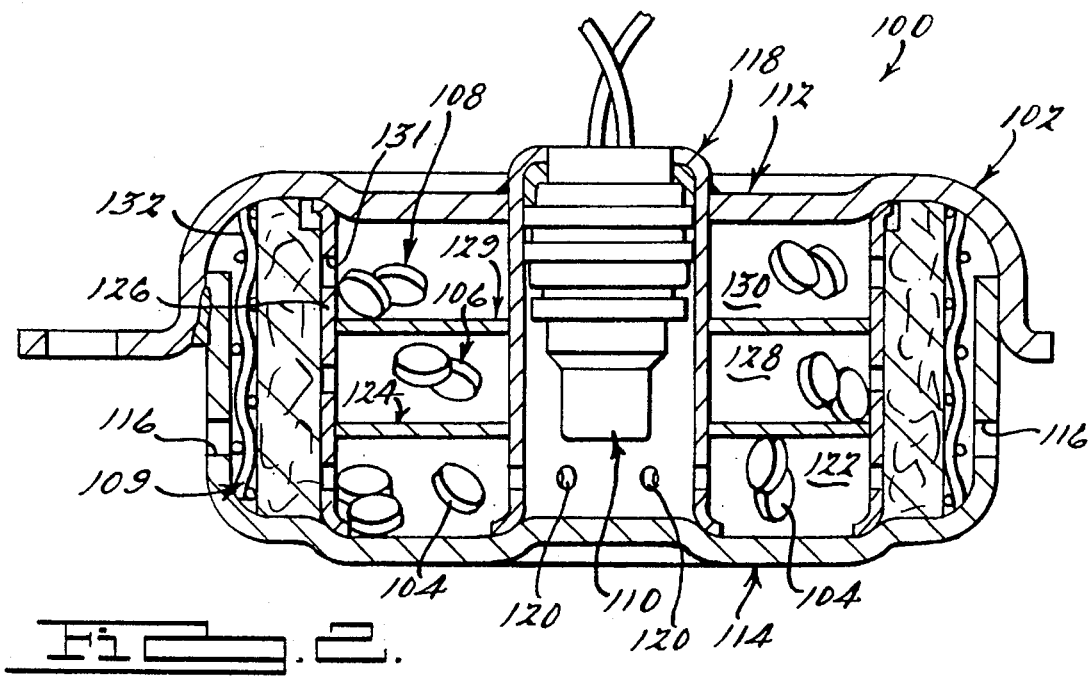
FIG. 2 is a cross-sectional view of a second exemplary stacked configuration inflator embodiment in accordance with the present invention.

As seen in FIG. 2 of the drawing, a variable output inflator 100 in accordance with second exemplary "stacked" constructed embodiment of the present invention comprises four major components, namely, a housing 102, nonazide propellant charges 104, 106 and 108, a filter 109, and an igniter 110.

Like inflator 10, the inflator housing 102 is formed by two dish-shaped sections 112 and 114 that are welded together in inverted nested relationship. The lower housing portion 114 contains a plurality of apertures 116 for the discharge of gas produced by the propellant into an air bag (not shown).

The housing 102 is provided with a centrally disposed igniter support tube 118 having a flared lower end portion that is welded to a complementary boss in the lower housing portion 114. Tube 118 supports the igniter 110 internally thereof, and is welded to the upper housing portion 112.

The igniter tube 118 is provided with a plurality of apertures 120 disposed in a circumferential array at a point underlying the igniter 110. The apertures 120 allow a flame front generated by the igniter 110 to pass to the nonazide propellant charge 104 located within a first combustion chamber 122. A first barrier wall 124 is positioned to extend between the igniter tube 118 and a propellant retainer sleeve 126 to form a second combustion chamber 128 positioned above the first chamber 122 within the housing 102. Propellant charge 106 is located within the second combustion chamber 128. A second barrier wall 129 is positioned to extend between the igniter tube 118 and sleeve 126 to form a third combustion chamber 130 above the second chamber 128 within housing 102. Propellant charge 108 is located within the third chamber 130. The retainer sleeve 126 has a plurality of apertures 131 therein to permit a radially outward passage of gas generated by the propellant charges 104, 106 and 108. The filter 109 comprises a fine wire mesh annulus that is resiliently axially compressed between the housing portions 112 and 114 upon assembly thereof. The filter 109 is radially retained by a relatively heavy wire screen 132 that accommodates radial expansion of the filter element 109 due to longitudinal compression upon assembly of the housing components 112 and 114.

Just as with the first exemplary embodiment 10, the heat energy generated by the combustion of the propellant charge 104 causes subsequent delayed ignition of the propellant charges 106 and 108 by forced convection and/or conduction. The igniter flame front only passes into the first combustion chamber 122, while the heat produced therein conductively reaches the second and third combustion chambers 128 and 130 via the plurality of apertures 131.

As described above, the present invention advantageously utilizes the high combustion temperature of a nonazide propellant mixture to allow the respective combustion chambers to be completely segregated. In this manner, the overall inflation profile output by the gas generator can be optimally controlled and tailored to achieve a desired inflation profile. The conductively ignited second and third propellant chambers of the present invention achieves a desirable "low onset" S curve without sacrificing peak inflation time or pressure. In addition, by adjusting the respective sizes of the combustion chambers, utilizing more than three chambers, and/or varying the propellant load in the respective chambers, the inflation profile can be tailored to cover a range of between approximately 10 to 90 percentile vehicle occupants as opposed to conventional inflators which only provide a nominal 50 percentile occupant inflation profile.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

We claim:

1. A gas generator having a variable output gas generation rate comprising:

a housing having a plurality of apertures spaced therein;

a first propellant chamber located within said housing and arranged to be in fluid communication with said plurality of apertures;

at least a second propellant chamber and third propellant chamber located within said housing and arranged to be in fluid communication with said plurality of apertures, wherein said first and said at least second and third propellant chambers are respectively separated by a solid barrier element which prohibits direct fluid communication between the propellant chambers;

a first nonazide propellant charge positioned within said first chamber having a predetermined burn temperature;

at least a second nonazide propellant charge and third nonazide propellant charge respectively positioned within said second and third chambers; and an igniter positioned within said housing for supplying a flame front to only said first propellant chamber, wherein the ignition of said first charge by said flame front produces heat energy which subsequently conductively ignites said at least second and third nonazide propellant charges.

2. The gas generator of claim 1 wherein said first, second and third chambers are radially arranged about said igniter so as to form a pie configuration.

3. The gas generator of claim 1 wherein said first, second and third chambers are axially arranged relative to said igniter so as to form a stacked configuration.

4. The gas generator of claim 1 wherein each of said solid barrier elements are positioned relative to said housing so as to vary the size of said first and said at least second and third propellant chambers to create a desired inflation profile at ignition.

* * * * *